United States Patent [19]

Mercuri et al.

[11] Patent Number: 5,192,605
[45] Date of Patent: Mar. 9, 1993

[54] EPOXY RESIN BONDED FLEXIBLE GRAPHITE LAMINATE AND METHOD

[75] Inventors: Robert A. Mercuri, Seven Hills; Edwin J. Ohneth, North Olmsted; Richard T. Lewis, Parma Heights, all of Ohio

[73] Assignee: UCAR Carbon Technology Corporation, Danbury, Conn.

[21] Appl. No.: 769,554

[22] Filed: Oct. 1, 1991

[51] Int. Cl.[5] .................. B32B 5/16; B32B 15/08; B32B 17/10; B32B 27/38
[52] U.S. Cl. ................... 428/224; 428/283; 428/408; 428/415; 428/416
[58] Field of Search ............. 428/408, 415, 416, 283

[56] References Cited

U.S. PATENT DOCUMENTS

| | | | |
|---|---|---|---|
| 3,404,061 | 10/1968 | Shane et al. | 161/125 |
| 4,973,516 | 11/1990 | Yamaoka et al. | 428/408 |
| 4,980,233 | 12/1990 | McCullough, Jr. et al. | 428/408 |

Primary Examiner—Jenna L. Davis
Assistant Examiner—Kathryne E. Shelborne
Attorney, Agent, or Firm—F. J. McCarthy

[57] ABSTRACT

A flexible graphite laminate of flexible graphite and a core material bonded through an intermediate coating of an epoxy resin composite comprising an epoxy resin having a glass transition temperature after cure of below 120° C. and particles of a thermoplastic agent dispersed in the epoxy resin and having a crystalline or partially crystalline structure and a melting temperature of between 120° C. and 200° C.

5 Claims, 7 Drawing Sheets

ND METHOD

EPOXY RESIN BONDED FLEXIBLE GRAPHITE LAMINATE AND METHOD

FIELD OF THE INVENTION

This invention relates to a continuous on-line method of laminating flexible graphite to a core material composed of metal, fiberglass or carbon with the flexible graphite bonded to the core material through an epoxy resin composite for forming a laminate impervious to organic solvents.

BACKGROUND OF THE INVENTION

Flexible graphite reinforced with a metal or fiberglass core is currently used as a sealing gasket for the engine block and cylinder head in an automobile engine. A laminate of flexible graphite and metal may be physically formed by impressing a flexible graphite facing over a metal sheet containing multiple tangs which perforate the facing to mechanically interlock the laminate. Alternatively the laminate may be formed by adhesively bonding flexible graphite to the metal core. The adhesive composition must form an intergral bond between the flexible graphite and core material which is chemically and thermally stable and is impervious to organic solvents such as methylethyl ketone. Moreover, the procedure for laminating flexible graphite to a sheet of metal such as steel must be carried out in a manner which will not cause the flexible graphite to blister. In a corresponding U.S. patent application Ser. No. 709214 filed Jun. 3, 1991, a method to form a flexible graphite laminate is disclosed using a phenolic resin adhesive composition which is cured off-line under controlled conditions of temperature and time to avoid surface blistering and delamination.

A method of fabricating a flexible graphite metal core laminate in which the flexible graphite is cohesively bonded to the metal core through an epoxy resin in a continuous on-line operation without a post treatment cure is preferable to all other currently known fabrication techniques.

SUMMARY OF THE INVENTION

It has been discovered in accordance with the present invention that flexible graphite may be bonded to a core material composed of metal, fiberglass or carbon through an epoxy resin composite to form a flexible graphite laminate impervious to organic solvents in a continuous on-line operation. The laminate is formed using an epoxy resin composite comprising an epoxy resin having a glass transition temperature after cure of below 120° C. and particles of a thermoplastic agent dispersed in the epoxy resin with the thermoplastic agent having a crystalline or partially crystalline structure and a melting temperature in the range of 120° C. to 200° C. with the laminate formed upon contact between the flexible graphite, core material and a cured coating of the epoxy resin composite upon reheating at a temperature equal to or above the melting temperature of the thermoplastic agent. The composite of epoxy resin and thermoplastic agent having the aforementioned physical properties produces a product which is processable under conditions not normal for an epoxy resin.

The preferred method of the present invention for forming a laminate between flexible graphite and a core material composed of metal, fiberglass or carbon comprises the steps of:

forming a liquid composite from an epoxy resin having a glass transition temperature after cure of below 120° C. and finely divided particles of a thermoplastic agent having a crystalline or partially crystalline structure and a melting point in the range of 120° C. to 200° C.;

depositing a coating of said composite over said core material;

drying said composite at a temperature and for a time to volatilize solvents from said composite;

curing said coating at a cure temperature and for a time sufficient to gel said epoxy resin;

simultaneously feeding said core material and flexible graphite through a pair of calender rolls at a predetermined feed rate with said flexible graphite positioned to intimately contact the cured coating on said core material;

heating said calender rolls to a temperature at least corresponding to the melting temperature of said thermoplastic agent and below 200° C. while said core material and flexible graphite are fed through said calender rolls so as to form said laminate on-line with said flexible graphite and core material cohesively bonded through said composite; and rolling said laminate upon a take-up roll at said predeterminated feed rate in a continuous operation.

BRIEF DESCRIPTION OF THE DRAWINGS

Other advantages of the present invention will become apparent from the following detailed description of the invention when read in conjunction with the accompanying drawings of which.

DETAILED DESCRIPTION OF THE INVENTION

The term "flexible graphite" as used herein is the product obtained by compressing the exfoliated reaction product of rapidly heated graphite particles which have been treated with an agent capable of intercalating into the crystal structure of the graphite to expand the particles at least 80 or more times in the direction perpendicular to the carbon layers in the crystal structure as taught in U.S. Pat. No. 3,404,061, the disclosure of which is incorporated herein by reference. Flexible graphite may be compressed into a thin sheet of between 3-65 mils in thickness with a density approaching theoretical density, although a density of about 70 lbs/ft$^3$ is acceptable for most applications.

Figures 1, 1A:
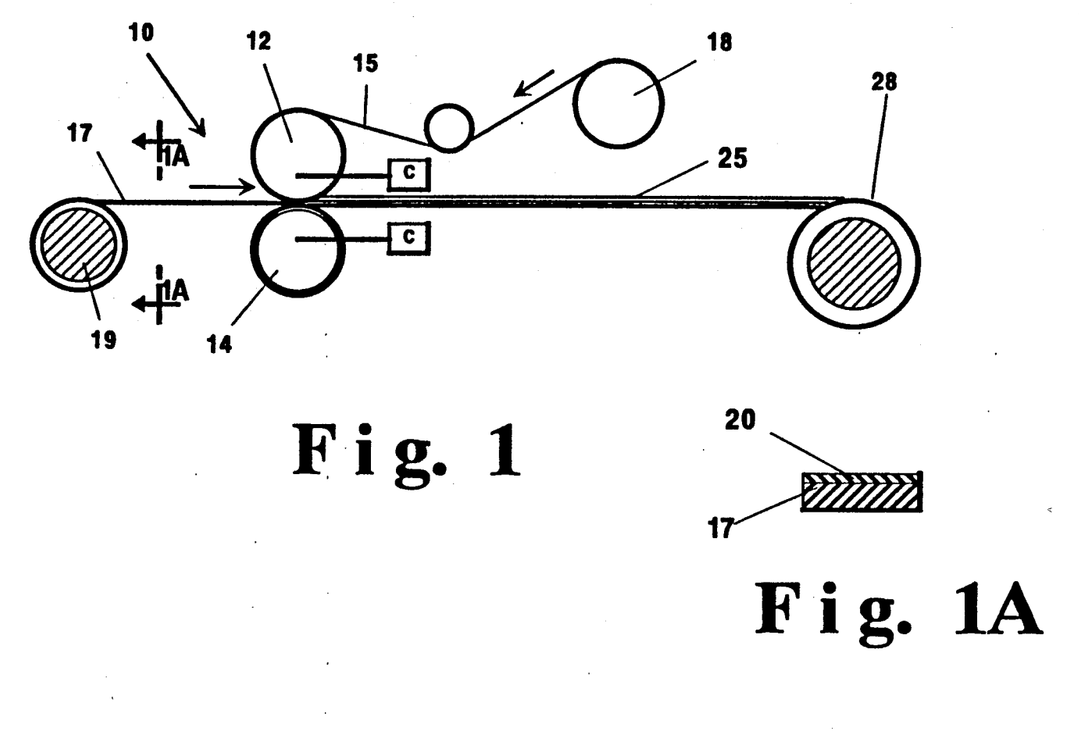
FIG. 1 is a schematic illustration of a calender assembly for forming a flexible graphite laminate in accordance with the present invention.
FIG. 1A is a cross section of FIG. 1 taken along the lines 1A—1A.

The calender roll assembly 10 as shown in FIG. 1 includes two calender rolls 12 and 14 aligned relative to one another to calender a sheet of flexible graphite 15 to a sheet of core material 17 composed of metal, fiberglass or carbon. The sheet of flexible graphite 15 is fed through the calender assembly 10 from a supply roll 18 simultaneously with the sheet of core material 17 at a fixed feed rate generally between 5-10/ft/min to form a laminate 25 which is rolled onto a take-up roll 28 in a continuous operation. Another sheet of flexible graphite (not shown) may likewise be fed into the calender assembly 10 from a supply roll (not shown) simultaneously with the first sheet of flexible graphite 15 to produce a laminate of three layers with the core 17 as the center layer. In this case the core 17 will be coated with the epoxy resin composite on each opposite side thereof.

Another sheet of core material (not shown) may likewise be fed into the calender system assembly 10 from a supply roll (not shown) simultaneously with the first sheet of core 17 and flexible graphite 15 to produce a laminate of three layers with the flexible graphite 15 as the center layer.

An epoxy resin formulated with a thermoplastic agent, as more fully described hereafter, is applied to a surface of the core material 17 to form a coating 20 which is preferably dried and cured off-line before it is wound onto a supply roll 19. It is, however, within the scope of the present invention to apply the epoxy resin composite, as here after described, to an uncoated core material 17 and to dry and cure the epoxy resin composite on-line, by passage through heaters (not shown) before the core material 17 is fed into the calender assembly 10. It is also within the scope of the present invention to apply the epoxy resin composite to the sheet of flexible graphite 15 before processing through the calender roll assembly 10.

The epoxy resin composite, applied to the core material 17 to form the coating 20, comprises a mixture of a liquid epoxy resin having a glass transition temperature as evident from a conventional DSC curve of less than 120° C. after cure and particles of a thermoplastic agent dispersed in the epoxy resin. The thermoplastic agent should have a crystalline or partially crystalline structure and a melting point in the range of 120° C. to 200° C. Examples of a thermoplastic agent meeting the above criteria include polyethylene; polypropylene; poly-1-butene; poly-1-pentene; poly-4-phenyl-1- butene; polyoxymethylene and Nylon 8,γ as well as blends, co-polymers etc. The preferred thermoplastic agent is an isotactic polypropylene. The thermoplastic agent should be suspended as finely divided particles uniformly distributed throughout the bulk epoxy resin. The concentration of thermoplastic agent must be high enough to lower the viscosity of the cured bulk epoxy when the epoxy resin composite is reheated to the melting temperature of the thermoplastic agent to permit the flexible graphite to cohesively bond to the core material under nominal calender roll pressure. Conversely, the thermoplastic agent must be low enough in concentration to assure a continuous epoxy phase in the bulk epoxy resin. The preferred concentration of thermoplastic agent in the epoxy resin should lie between 5 and 30 percent by weight with an optimum concentration of 8-15 percent. Any conventional epoxy resin may be used preferably based upon the diglycidyl ether of bisphenol A with the understanding that it has a glass transition temperature after cure of below 120° C. where the glass transition temperature is taken as the inflection point in the DSC curve for a cured sample.

In the preferred practice of the present invention the epoxy resin composite is applied to the surface of a sheet of a core material 17 to form the coating 20 which is first dried at a temperature to facilitate the removal of solvents and then cured by the application of heat at a temperature and for a time sufficient to cure the epoxy resin past its "gel point" where, for purposes of the present disclosure, it is irreversibly transformed from a viscous liquid to a cured product. However, it should not be cured at so high a temperature to cause charring or decomposition of the epoxy. According it is only necessary for purposes of the present invention to cause gelation to occur. For conventional epoxy resin formulations the manufacturer provides recommended cure temperature ranges which will cause gelation and curing to occur without decomposition. If two sheets of flexible graphite are used to form a three layer laminate, exclusive of any epoxy resin coated layer, the core 17 will be coated and cured on both sides thereof.

The core material 17 is wound onto a supply roll 19 from which it is fed simultaneously with a sheet of flexible graphite 15 through the calender assembly 10 with the coating 20 engaging the sheet of flexible graphite as the two sheets of material pass through the calender rolls 12 and 14 respectively. The calender rolls 12 and 14 are preheated through a heating control "c" to a temperature sufficient to raise the temperature of the coating 20 to at least the melting temperature of the thermoplastic agent in the epoxy resin and below the temperature which is known to cause surface blistering in the flexible graphite. It is known that at about 200° C. or above flexible graphite is susceptible to and will, with time, blister under normal atmospheric conditions. Accordingly a thermoplastic agent must be preselected having a melting temperature below 200° C. It is however preferred to operate the calender rolls at a temperature in a range of between 150° C.–175° C. The melting temperature of the thermoplastic agent must be selected to be equal to or below the calender roll temperature but should preferably be above the glass transition temperature of the epoxy resin. The temperature of the roll has to be high enough to melt the thermoplastic agent so as to substantially lower the viscosity of the cured epoxy composite and provide a rheology which permits the flexible graphite to cohesively bond to the core material. This will not occur using a conventional bisphenol A based epoxy resin without the inclusion of the thermoplastic agent. The melting temperature of the thermoplastic agent is determined by its selection which is limited only in that it have a crystalline or partially crystalline structure and is equal to or less than the roll temperature. Accordingly, it can be a single polymer or a polymer blend or co-polymers etc. which in combination provide the desired melting characteristic at the preselected calender roll temperature.

Figure 2:
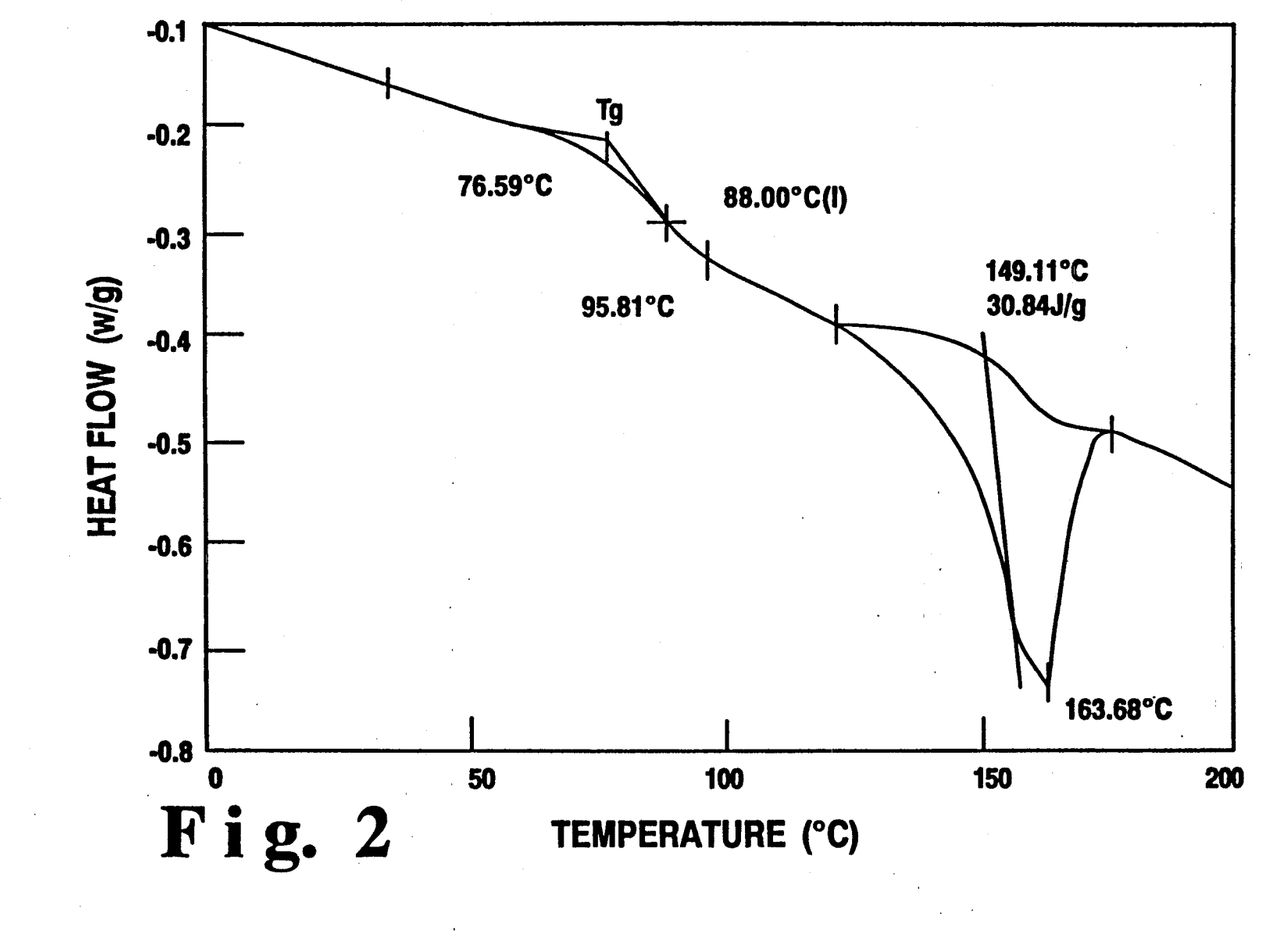
FIG. 2 is a "DSC" (differential scanning calorimetry) curve at a heating rate of 10° C. per minute for a sample of a cured epoxy resin having a thermoplastic agent, as defined in the present invention, suspended in the resin.
Figure 3:
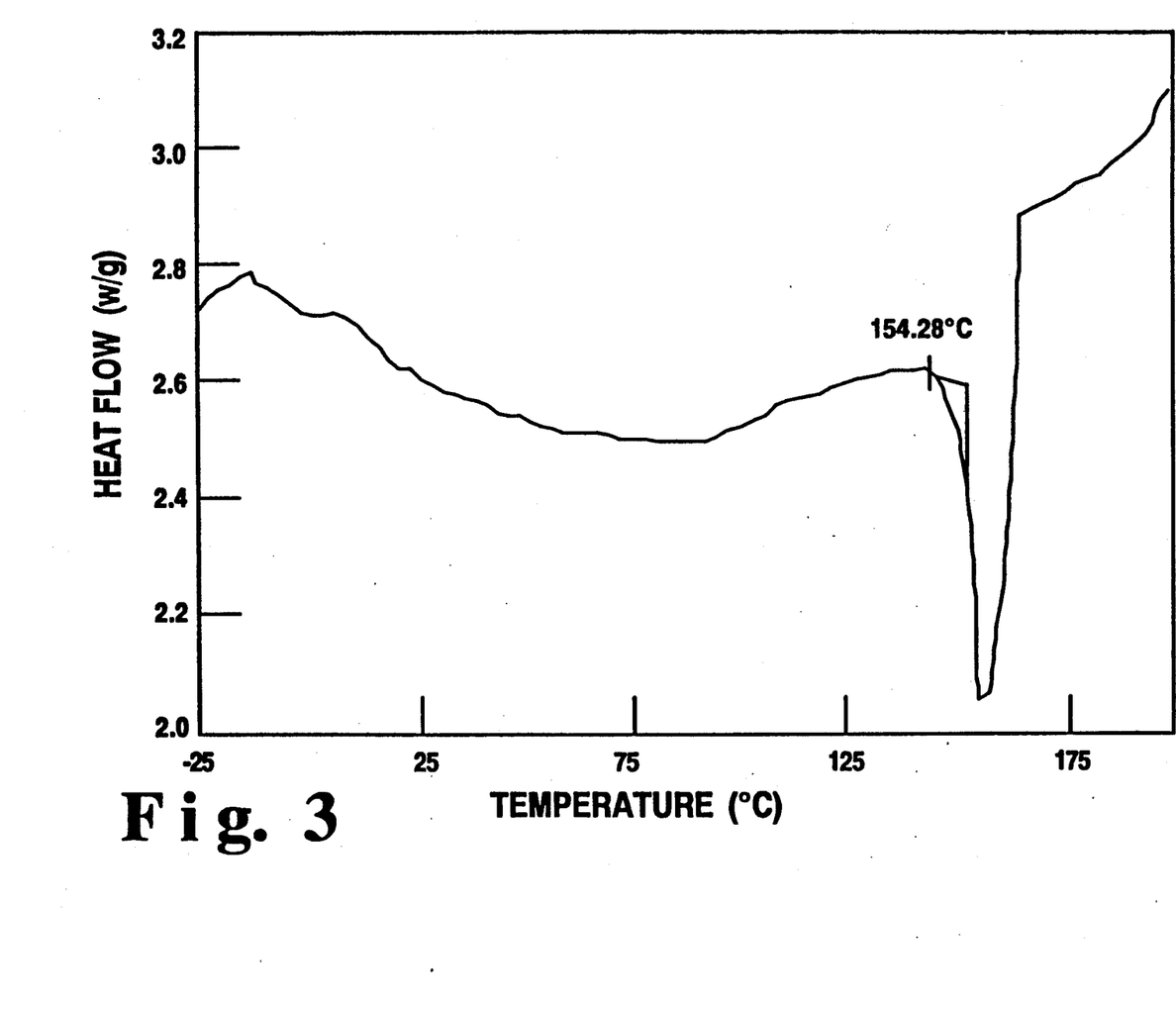
FIG. 3 is a DSC curve at a heating rate of 10° C. per minute for a sample polypropylene film.
Figure 4:
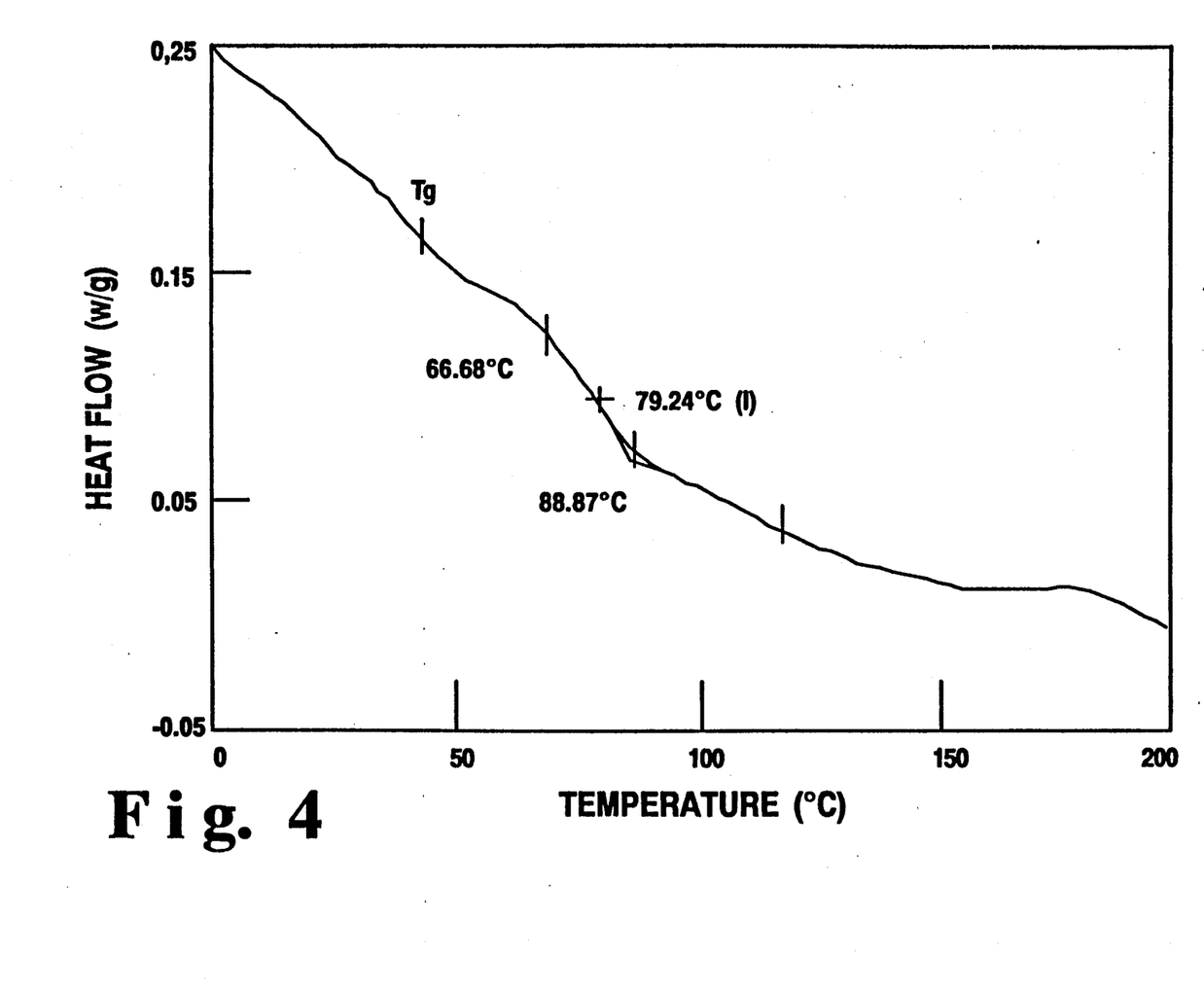
FIG. 4 is DSC curve at a heating rate of 10° C. per minute for another sample of an epoxy resin similar in composition to that used in the measurement of FIG. 2 without the thermoplastic additive.

A DSC curve at a heating rate of 10° C. per minute for a cured epoxy resin composite, as used in accordance with the present invention to form a flexible graphite laminate, is shown in FIG. 2. The epoxy resin sample is labeled MOR-AD P-80 A available from the Morton Chemical Co. and includes an epoxy resin having a DSC glass transition temperature of below 120° C. and finely divided particles of crystalline polypropylene suspended in the epoxy resin. The DSC curve shows a change in heat capacity depicting the onset of the glass transition at about 77° C. and extending through a temperature range ending about 96° C. The inflection point of this range, i.e., 88° C. is considered the DSC glass transition temperature. As the temperature is further increased an abrupt melting endotherm is observed upon reaching the melting temperature of the thermoplastic agent which for the sample of FIG. 2 is at a temperature about 149° C. FIG. 3 shows a DSC curve for a polypropylene film sample which exhibits a melting characteristic consistent with the temperature range for the melting endotherm of FIG. 2. FIG. 4 shows a DSC curve for a fully cured epoxy resin sample similar in composition to the epoxy formulation of FIG. 1 without a thermoplastic additive. Without the addition of the thermoplastic additive the melting endotherm is not present in the DSC curve. The thermoplastic additive was found to be essential to produce a flexible graphite laminate.

Figure 5:
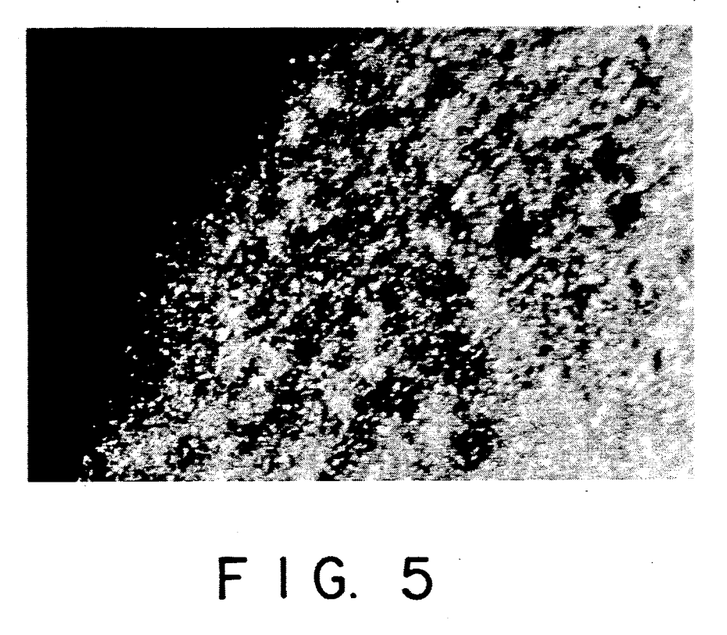
FIG. 5 is a photographic print from a hot-stage microscopy examination of the resinous composition of FIG. 1 at a magnification of 104x taken at room temperature.
Figure 6:
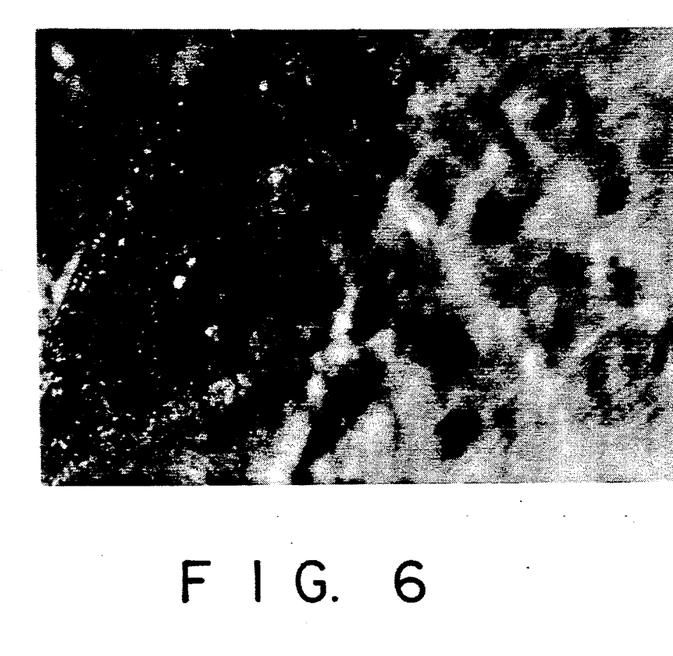
FIG. 6 is a similar photographic print of the epoxy resin composition of FIG. 1 at the temperature corresponding to the melting temperature of the thermoplastic agent.
Figure 7:
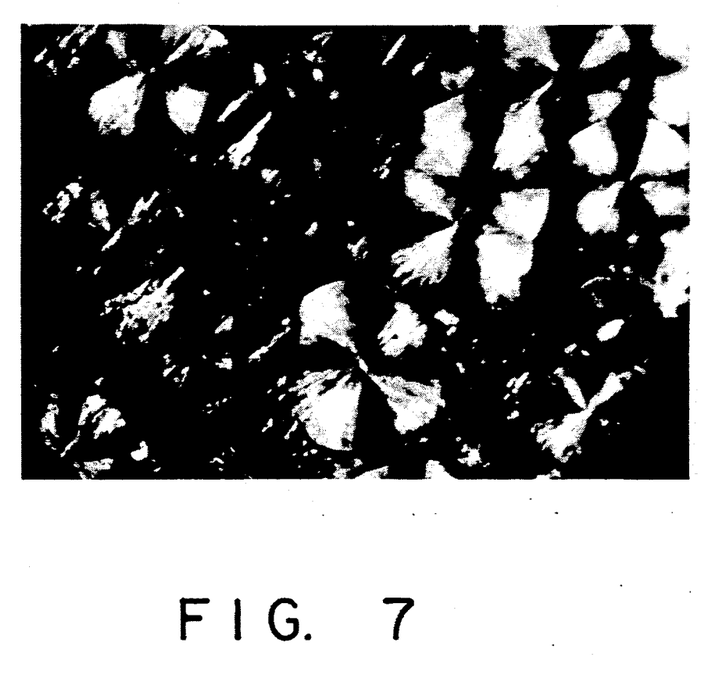
FIG. 7 is another photographic print of the resin composition of FIG. 1 from the hot-stage microscopy examination after cooldown.

FIGS. 5, 6 and 7 are photographic prints taken from a hot-stage microscopy examination of the epoxy resin composite corresponding to the sample used in the DSC measurement of FIG. 2. The photographs were taken using a Leitz Orthomat camera at a magnification of 104x with conventional hot-stage microscopy apparatus. The observations were carried out using reflected polarized light to examine the phase behavior of the resin samples. FIG. 5 clearly shows the presence of the finely divided crystalline and presumably isotactic polypropylene particles dispersed in the transparent epoxy resin phase. The hot stage was heated at a rate of approximately 6° C./min up to approximately 200° C. The crystalline polypropylene additive began to melt in the 130° C.-136° C. range as evident from FIG. 6 and was completely melted by 158° C. In the 160° C. to 200° C. range the composite sample contained two immiscible transparent mobile liquids. After cooldown large crystals were evident as shown in FIG. 7 substantiating that the thermoplastic agent recrystallizes upon cooling and melts again upon reheating.

The following table is illustrative of examples of different epoxy materials tested under conditions to satisfy industry requirements for an acceptable laminate between flexible graphite and a core material. By "bondable" is meant a uniform graphite to metal core bond that can withstand an engineers "scratch" & "bend" test based upon bending the sample 90° in opposite directions and scratching the surface with the conditions of acceptability based upon adaptability to continuous operations for rolled laminated product. The epoxy adhesives may be diluted with methylethyl ketone or the like to control viscosity before it is coated on the core to form a desired coating thickness of between 0.3-1.0 mils. In each case the epoxy coating was dried on the steel core for 15 minutes at 61° C. and then heated at a recommended cure temperature of 217° C. for 5 minutes until the coating is cured.

TABLE I

| Bonding Test Results - Steel Core | | | | |
|---|---|---|---|---|
| | | Delamination Tests | | |
| Epoxy Composition | Bondable by pressing @ 155-160° C. | #3 oil 150° C. 5 hrs. | Ethylene Glycol Coolant 100° C. | Resistance to solvent (MEK) |
| Morton Chem. P-80A | Yes | Yes | Yes | Yes |
| Morton Chem. 236-93A D-16764 | No | — | — | — |
| Morton Chem. 370-25 | Yes | Yes | Yes | No |
| Velspar SE-19P | No | — | — | — |
| Velspar 52-140 | Yes | No | No | No |
| P-80A pressed at 121° C. | No | — | — | — |

The epoxy composition P-80A corresponds to the epoxy resin composite of the present invention whereas the other epoxy compositions are all epoxy adhesives which do not contain a thermoplastic additive. The requirement that the laminated product be resistant to a solvent such as MEK is the most stringent test.

What we claim is:

1. A flexible graphite laminate of flexible graphite and a core material composed of metal, fiberglass or carbon with the flexible graphite bonded to said core material through an intermediate coating of an epoxy resin composite comprising an epoxy resin having a glass transition temperature after cure of below 120° C. and particles of a thermoplastic agent dispersed in the epoxy resin and having a crystalline or partially crystalline structure and a melting temperature in the range of 120° C. and 200° C. with the laminate formed upon contact between said flexible graphite, said core material and a cured coating of said epoxy composite upon reheating at a temperature equal to or above the melting temperature of said thermoplastic agent.

2. A flexible graphite laminate as defined in claim 1 wherein the concentration of said thermoplastic agent in said epoxy resin is between 5 to 30 percent by weight.

3. A flexible graphite laminate as defined in claim 2 wherein the concentration of said thermoplastic agent in said epoxy resin is between 8 and 15 percent by weight.

4. A flexible graphite laminate as defined in claim 2 wherein said thermoplastic agent is selected from the group consisting of: polyethylene; polypropylene; poly-1-butene; poly-1-pentene; poly-4-phenyl-1-butene; polyoxymethylene and Nylon 8,γ.

5. A flexible graphite laminate as defined in claim 4 wherein said thermoplastic agent is selected from the group consisting of: polyethylene; polypropylene; poly-1-butene; poly-1-pentene; poly-4-phenyl-1-butene; polyoxymethylene and Nylon 8γ.

* * * * *